Jan. 21, 1947.  H. UREN ET AL  2,414,780
ELECTRICAL WELDING MACHINE
Filed April 18, 1944  2 Sheets-Sheet 1
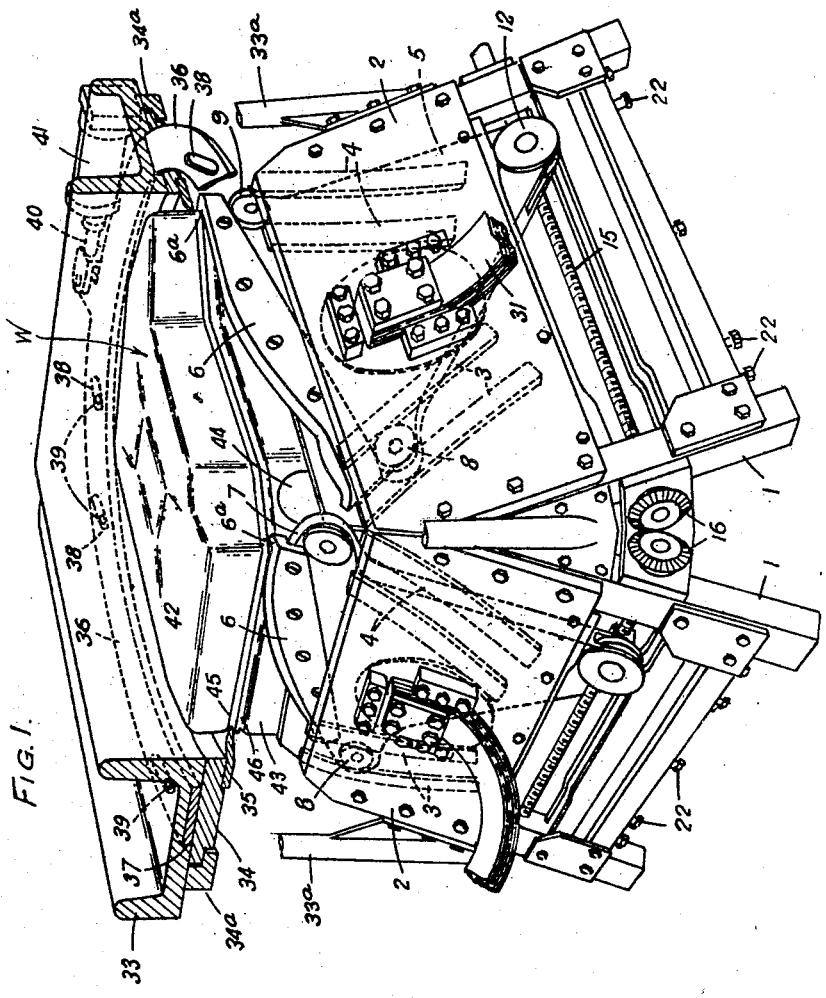
INVENTORS
HAROLD UREN
REGINALD THOMAS ALBERT DALLISSON
BY
ATTORNEYS Jan. 21, 1947. H. UREN ET AL 2,414,780
ELECTRICAL WELDING MACHINE
Filed April 18, 1944 2 Sheets-Sheet 2
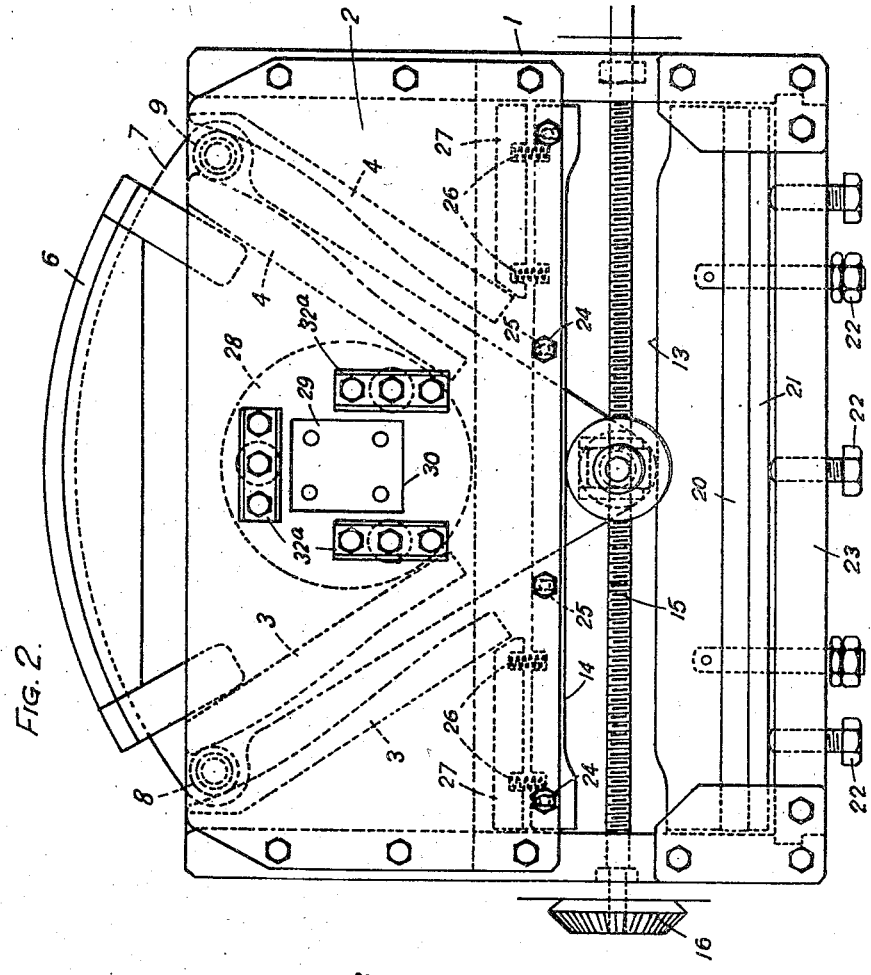
INVENTORS
HAROLD UREN
REGINALD THOMAS ALBERT DALLISSON
BY
Whittemore Hulbert & Belknap
ATTORNEYS

UNITED STATES PATENT OFFICE 2,414,780

ELECTRICAL WELDING MACHINE

Harold Uren, Chigwell, and Reginald Thomas Albert Dallisson, Ilford, England

Application April 18, 1944, Serial No. 531,626
In Great Britain May 11, 1943

6 Claims. (Cl. 219—4)

This invention relates to electrical resistance welding machines for joining together metallic bodies in a continuous seam or in a series of overlapping or uniformly spaced spotwelds.

The machine is particularly adapted for use in welding sheet metal boxes, tanks and the like which are required to be fluid tight and wherein the edges or surfaces to be welded are of such contour or the parts to be welded are of such cross section that it is difficult or impossible to weld by known roller-seam or buttwelding machines.

According to one aspect of the invention a welding machine comprises a series of electrodes which remain stationary during the welding operation and a corresponding series of other electrodes arranged in such a manner as to be moved simultaneously to cooperate with the stationary electrodes to produce a series of welds on a workpiece.

According to another aspect of the invention a welding machine comprises a series of electrodes which remain stationary during the welding operation and a series of other electrodes which cooperate with the stationary electrodes and are given a rolling movement with respect to the workpiece to produce a series of discontinuous or overlapping welds.

The electrodes are guided to follow a generally cycloidal path by means of rollers or the like travelling in curved tracks. The movable electrodes may be geared together and driven by a common source of power or they may be independently driven by separate power units.

To enable the invention to be fully understood it will now be described with reference to the accompanying drawings, in which:

Fig. 1 is a perspective view of a welding machine embodying the invention,

Fig. 2 is a side view showing one of the movable electrodes and its mounting on a side frame, Fig. 3 is an end view of Fig. 2 partly in section.

As shown in Fig. 1 the main frame of the machine is generally in the form of a frustum of a pyramid including four sloping side frames 1. Only one of these side frames will be described, but it will be understood that the remaining side frames are identical. The frame 1 has a plate 2 bolted thereto and provided on its underface with pairs of curved guide bars 3, 3 and 4, 4. A flat segment shaped electrode holder 5 is mounted on the underside of the plate 2, an electrode 6 being bolted to the curved edge 7 of the holder 5. At each end of the curved edge the electrode holder 5 carries a roller 8, 9 adapted to run between the pairs of guide bars 3 and 4 respectively. The holder 5 may be electrically insulated from the main frame of the machine, but it will be understood that the machine will function satisfactorily if the holder 5 and electrode 6 are not insulated from the frame provided that the parts to be welded, when in clamped position for welding, are themselves insulated from the main frame. The lower corner of the holder 5 carries a spindle 10 on which are mounted rollers 11, 12 which are adapted to run on tracks 13, 14 respectively, which are mounted on the side frame 1.

A lead screw 15 is rotatably mounted in the side frame and has secured to its ends bevel gears 16 by which the lead screws of adjacent side screws are coupled. The lead screw has a cylindrical nut member 17 threaded thereon, the nut being slidably mounted in a housing 18 secured to the spindle 10. The housing is provided with an elongated slot indicated at 19 to permit relative movement of the nut 17 and lead screw 16 for the purpose hereinafter described.

The track 13 is supported on a rubber strip 20 carried by plate 21 which is adjusted relative to the side frame by means of adjusting screws 22 threaded through the bottom fixed plate 23. The track 14 is secured to the plate 2 by bolts 24 extending through elongated slots 25, the track 14 being urged downwardly by springs 26 extending between the track and fixed abutment plates 27. The resilient mounting of the track 14 accommodates upward movement of the roller 12 when the screws 22 are actuated to apply welding pressure to the electrode 6.

A circular metal contact plate 28 is provided having a raised platform 29 extending through an opening 30 in the plate 2 and adapted to be bolted to a flexible laminated current carrying member 31. The contact plate 28 is pressed into engagement with the electrode holder 5 by springs 32 carried in housings 32a bolted to the plate 2.

An upper frame 33 is secured to the main frame by pillars 33a and is provided with four electrode holders 34 each having an electrode 35 secured to its inner edge. The holders 34 are slidably mounted in suitable guides 34a which are fixed to but insulated from the upper frame 33. A flat ring 36 is rotatably mounted in a groove 37 in the frame 33 and is formed with angularly disposed slots 38 into which project studs 39 on the holder 34 preferably carrying rollers. The ring 36 is connected by a link 40 to a fluid pressure operated piston 41 which is actuated to rotate the ring through a small arc in opposite directions as desired to move the electrodes 35 towards and away from the workpiece to be welded. The electrode holders 34 are connected with the welding circuit by any suitable means.

The profile of each electrode 6 is such that it may be made to roll along the appropriate portion of the line of the weld, forming line contact with the material to be welded for substantially the full width of the operative face at successive positions through its length. As the electrode is moved every point in turn along the operative face describes a generally cycloidal path into and out of the work-engaging position.

It will be understood that the number and shape of the electrodes may be varied according to the work to be welded and in the case of a workpiece comprising a substantially rectangular box having rounded corners, such as the workpiece W in Fig. 1, one stationary electrode such as 35 and one rolling electrode such as 6, will be provided for each separate side or edge to be welded, the ends 6a of the electrodes 6 being curved to extend round part of adjacent sides of the workpiece whereby a series of overlapping welds are obtained.

The machine according to Fig. 1 is designed to weld two halves 42, 43 of a sheet metal can of generally rectangular shape having a filler spout 44. The halves 42, 43 are formed with flanges 45, 46 extending round the four side walls of the can.

To effect a weld the superimposed halves of the can are positioned on a suitable support at the top of the frame 1, the electrodes 35 being withdrawn by the cam ring to permit this. The screws 22 are primarily adjusted and fixed so as to provide the requisite pressure on the electrodes 6, and the electrodes 35 are returned by the ring 36 to engage the flange 45. The lead screws 15 which are geared together are rotated by any suitable driving means, the nuts 19 traversing the lead screws and the lower end of each holder 5 is drawn across the frame. As the rollers 8, 9 are guided in the tracks 3, 4 the electrodes 6 are given a rolling movement along the flange 46 and the flanges are welded together by the heating current which is supplied through the carrier 31 to the contact plate 28 which is urged into rubbing contact with the holder 5. A limit switch may be provided in the welding circuit of each holder 5 and adapted to be operated by the movement of the electrode so that at the completion of each weld the welding circuits are opened automatically.

A welding heat control panel may be provided embodying an automatic timing device adapted to interrupt the welding current from the transformer intermittently, causing pulsations of current which produce a series of closely spaced spot welds, the time interval of the pulsations being adjusted by suitable means to cause the spot welds to overlap to produce a continuous welded seam. In cases where the contour of the weld line is such that the desired line contact between the movable electrode 6 and the work cannot be entirely maintained means may be provided for varying the current, or the speed of traverse of the electrode, or both, as the welding proceeds to ensure the generation of sufficient welding heat. The electrodes may be cooled by water or other circulating fluid in known manner.

The angle of the electrode 6 to the stationary electrode 35 may be varied to suit different welding operations and in cases where the weld lines on adjacent sides or facets of the workpiece form a suitable angle, one pair of cooperating electrodes 6, 35 may be formed to weld along two or more adjacent sides. Also in the case of one side requiring a relatively long weld seam, two or more pairs of electrodes may be provided for welding the long seam.

Where a single power unit is adapted to drive the lead screws 15 the drive may be by way of a variable speed device and clutch mechanism, all screws 15 being simultaneously rotated by the intermeshing gears 16. A trigger or trip mechanism may be provided which is actuated by the electrode holders 5 to disengage the driving clutch on the completion of the weld.

Alternatively each lead screw may be driven independently by a separate motor and a suitable arrangement of cams and followers may then be provided operating either in conjunction with the lead screws or along the tracks 13, 14 to vary the speed of the driving motors as the welding proceeds. Similarly a system of cams and followers may be provided to vary the welding current through a suitable system of electrical relays or rheostats as the welding proceeds.

We claim:

1. An electrical resistance welding machine comprising a series of angularly arranged electrodes which remain stationary during the welding operation and a series of correspondingly arranged electrodes having a rolling movement with respect to the workpiece cooperating with the stationary electrodes to produce continuous overlapping welds along adjacent angularly disposed sides of the workpiece.

2. A welding machine according to claim 1 wherein the movable electrodes are guided to follow a generally cycloidal path during the welding operation.

3. A welding machine according to claim 1 wherein the electrodes are guided by rollers or the like which travel along curved tracks.

4. A welding machine according to claim 1 wherein the movable electrodes are interconnected by gearing and driven by a common source of power.

5. A welding machine according to claim 1 wherein the plane of each movable electrode is at an angle to that of the cooperating stationary electrode.

6. A welding machine according to claim 1 wherein means are provided for adjusting the pressure of the movable electrodes on the workpiece.

HAROLD UREN.
REGINALD THOMAS ALBERT DALLISSON.